United States Patent [19]

Marko

[11] Patent Number: 5,850,831
[45] Date of Patent: Dec. 22, 1998

[54] LOOSE-TIGHT-LOOSE TWIST, TWISTED-TAPE INSERT SOLAR CENTRAL RECEIVER

[75] Inventor: Myroslaw Marko, Westlake Village, Calif.

[73] Assignee: Boeing North American, Inc., Seal Beach, Calif.

[21] Appl. No.: 719,522

[22] Filed: Sep. 27, 1996

[51] Int. Cl.[6] .................................................... F24J 2/30
[52] U.S. Cl. ..................... 126/645; 126/667; 126/671; 126/674; 126/680; 126/684; 126/681
[58] Field of Search .................................. 126/680, 684, 126/681, 390, 391, 392, 667, 645, 671, 674; 165/85, 95, 109.1

[56] References Cited

U.S. PATENT DOCUMENTS

| | | | |
|---|---|---|---|
| 4,044,753 | 8/1977 | Fletcher et al. | 126/680 |
| 4,384,550 | 5/1983 | Miller | 126/680 X |
| 4,485,803 | 12/1984 | Wiener | 126/680 X |
| 4,641,705 | 2/1987 | Gorman | 169/85 |
| 4,993,485 | 2/1991 | Gorman | 165/85 |

OTHER PUBLICATIONS

Friction and Heat Transfer Characteristics in Turbulent Swirl Flow Subjected to Large Transverse Temperature Gradients, Journal of Heat Transfer, Feb. 1968, p. 87, R. Thorsen, F. Landis.

*Primary Examiner*—Larry Jones
*Attorney, Agent, or Firm*—Harry B. Field; Steven E. Kahm

[57] ABSTRACT

This invention reduces a molten salt, solar central receiver's size, pressure loss and cost by using a loose-tight-loose twist, twisted-tape insert inside the receiver's tubes to enhance the tube's heat transfer coefficient. This twist staging is designed to provide a higher heat transfer coefficient in the receiver's central region where the solar flux is high and a reduced pressure loss at the low solar flux entrance and exit end regions. Because the twisted-tape enhances the tube's heat transfer ability it can be made larger in diameter than a smooth bore tube at an equivalent pressure loss. This reduces the number of tubes which results in a substantial reduction in receiver cost.

3 Claims, 3 Drawing Sheets

U.S. Patent    Dec. 22, 1998    Sheet 3 of 3    5,850,831
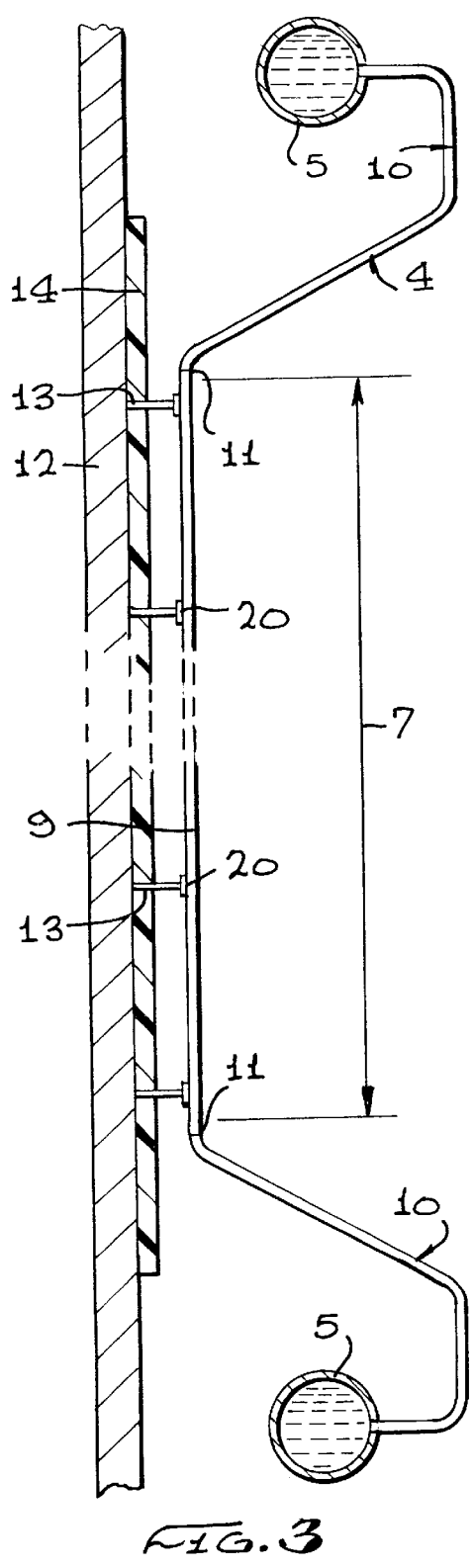
FIG. 3
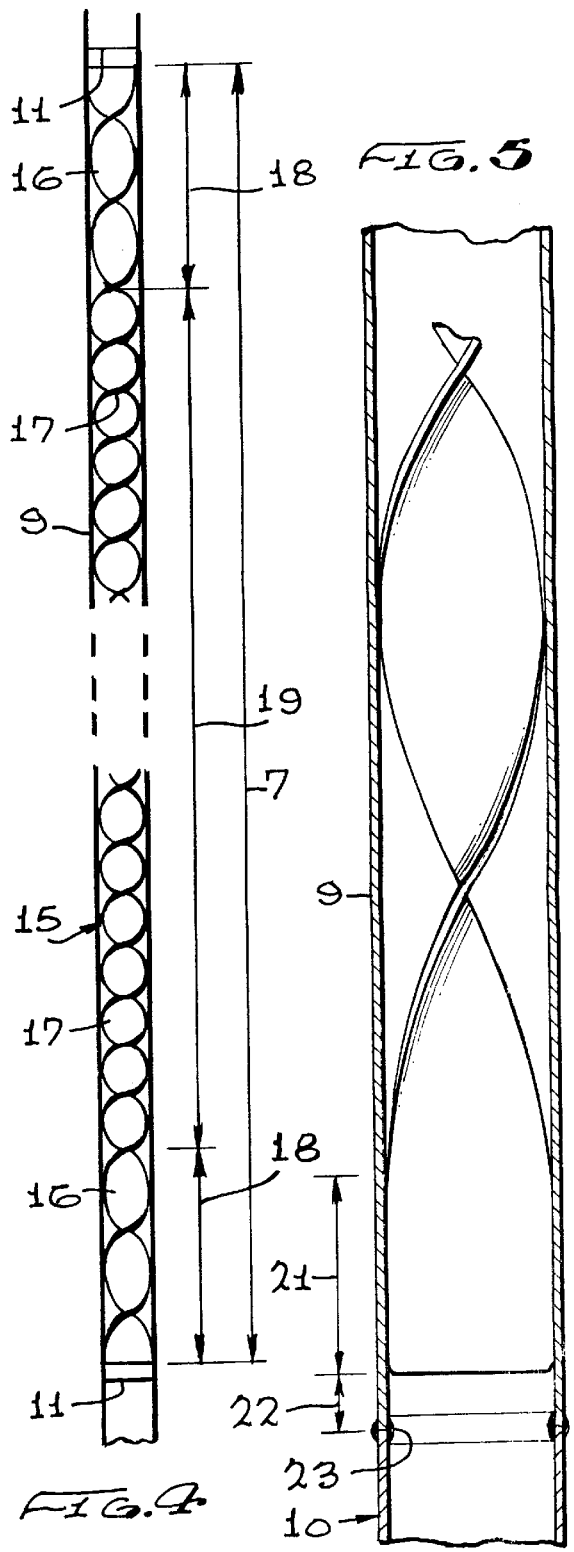
FIG. 5
FIG. 4

LOOSE-TIGHT-LOOSE TWIST, TWISTED-TAPE INSERT SOLAR CENTRAL RECEIVER

BACKGROUND OF THE INVENTION

1. Field of the Invention

This invention relates to using twisted-tape inserts in tubes to improve the heat transfer effectiveness of the molten nitrate salt heat transfer fluid in a solar central receiver, and more particularly for a loose-tight-loose staged twist configuration of the twisted-tape.

2. Description of the Related Art

Presently, receiver designs for molten salt, solar central receiver power plants are based upon a multi-smooth tube parallel flow panel, with the panel flow path arranged in a serpentine series configuration. This flow scheme compensates for the inherently poor heat transfer properties of molten salt, but at a cost in pressure loss because of the high velocities required to obtain acceptable heat transfer coefficients and the long flow path.

The receiver's size is set by limiting the absorbed solar flux induced thermal strain to a value determined by the tube material's allowable fatigue strain level for the imposed number of daily sun and cloud cover cycles over the receiver's lifetime. The induced thermal strain is caused by the through the wall (flux, wall thickness, and thermal conductivity dependent) and across diameter temperature (flux, and internal heat transfer coefficient dependent) gradients and is proportional to the tube material's thermal expansion coefficient.

Because a receiver's radiation and convection thermal losses are directly proportional to its area and temperature distribution, a smaller receiver with equivalent temperatures has lower thermal losses. However, because the light reflected by the solar plants sun collection field (heliostats) onto the receiver misses a smaller receiver more easily, its light spillage losses are greater. Still, the reduction in thermal losses offsets the light spillage losses except for very small receivers. Also, smaller receivers designed to achieve their reduced size by improved heat transfer through internal tube enhancement have lower fluid flow pressure losses and reduced capital costs because they have fewer, larger diameter, shorter tubes.

SUMMARY OF INVENTION

This invention uses a loose-tight-loose twist, twisted-tape insert inside a solar central receiver's tubes to provide the smallest, most efficient and economical molten nitrate salt, solar central receiver. The staged twist, twisted-tape receiver is smaller and less costly than a smooth tube receiver because the twisted-tape permits a significant increase in solar flux onto the receiver at lower fluid flow pressure losses by using fewer, shorter, larger diameter tubes.

OBJECTS OF THE INVENTION

It is an object of this invention to provide a loose-tight-loose twist, twisted-tape insert tailored to the imposed flux profile inside the receiver's tubes.

It is another object of this invention to provide the lowest cost, smallest, lowest pressure loss sodium-potassium nitrate salt, solar central receiver for a solar plant having an optimum heliostat field size.

It is also an object of the invention to limit the thermal strains on the solar central receiver's tubes.

It is yet another object of the invention to increase the absorbed solar flux of the solar central receiver.

It is a further object of the invention to reduce the size and pressure loss of the solar central receiver.

It is also a further object of the invention to lower the cost of fabrication for solar central receivers.

Other objects, advantages and novel features of the present invention will become apparent from the following detailed description of the invention when considered in conjunction with the accompanying drawings.

BRIEF DESCRIPTION OF THE DRAWINGS

FIG. 3 is a side view of the solar absorption panel showing a typical tube.

FIG. 4 is a detail view of the panel's solar absorption tube showing the staged twist, twisted-tape insert.

FIG. 5 is a detail view of the twisted-tape insert's end regions.

DETAILED DESCRIPTION OF THE PREFERRED EMBODIMENT

This invention relates to improving the heat transfer effectiveness of high temperature sodium-potassium nitrate salt receivers for solar central receiver power plants. These receivers may be of the cavity, billboard or cylindrical, surround field type. They are used to absorb solar radiation for the generation of thermal energy for process heat or steam generation for production of electric power.

Figure 1:
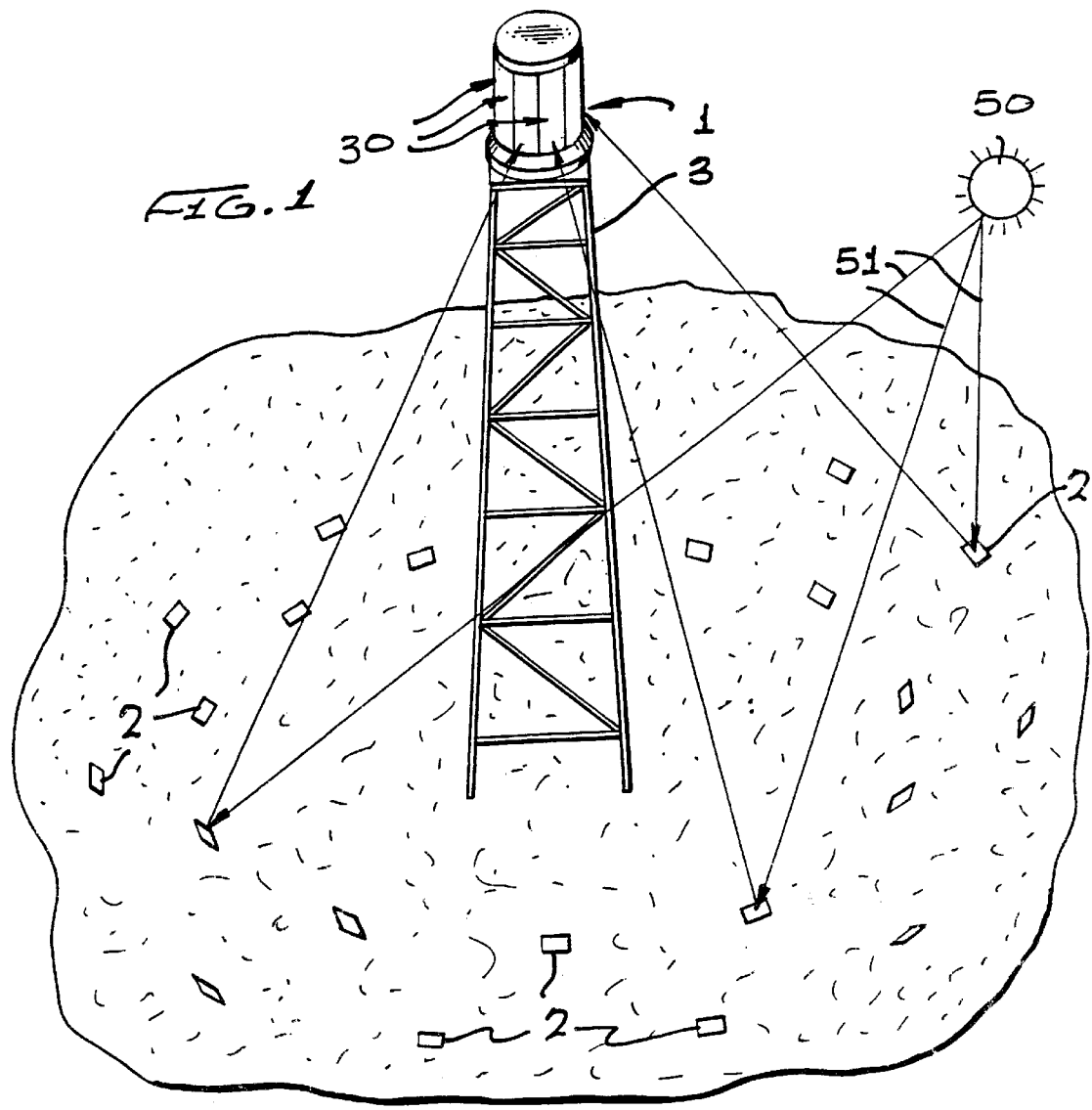
FIG. 1 is a configuration sketch of a cylindrical, molten salt solar central receiver power plant with a surround heliostat field.

FIG. 1 depicts a solar central cylindrical receiver 1 composed of multiple panels 30 with a surround heliostat field 2. The receiver 1 is mounted on a tower 3 to provide the most efficient focal point height. The sun 50 provides solar energy depicted as rays 51 which are reflected from heliostats 2 and are directed thereby to solar panel 10.

Figure 2:
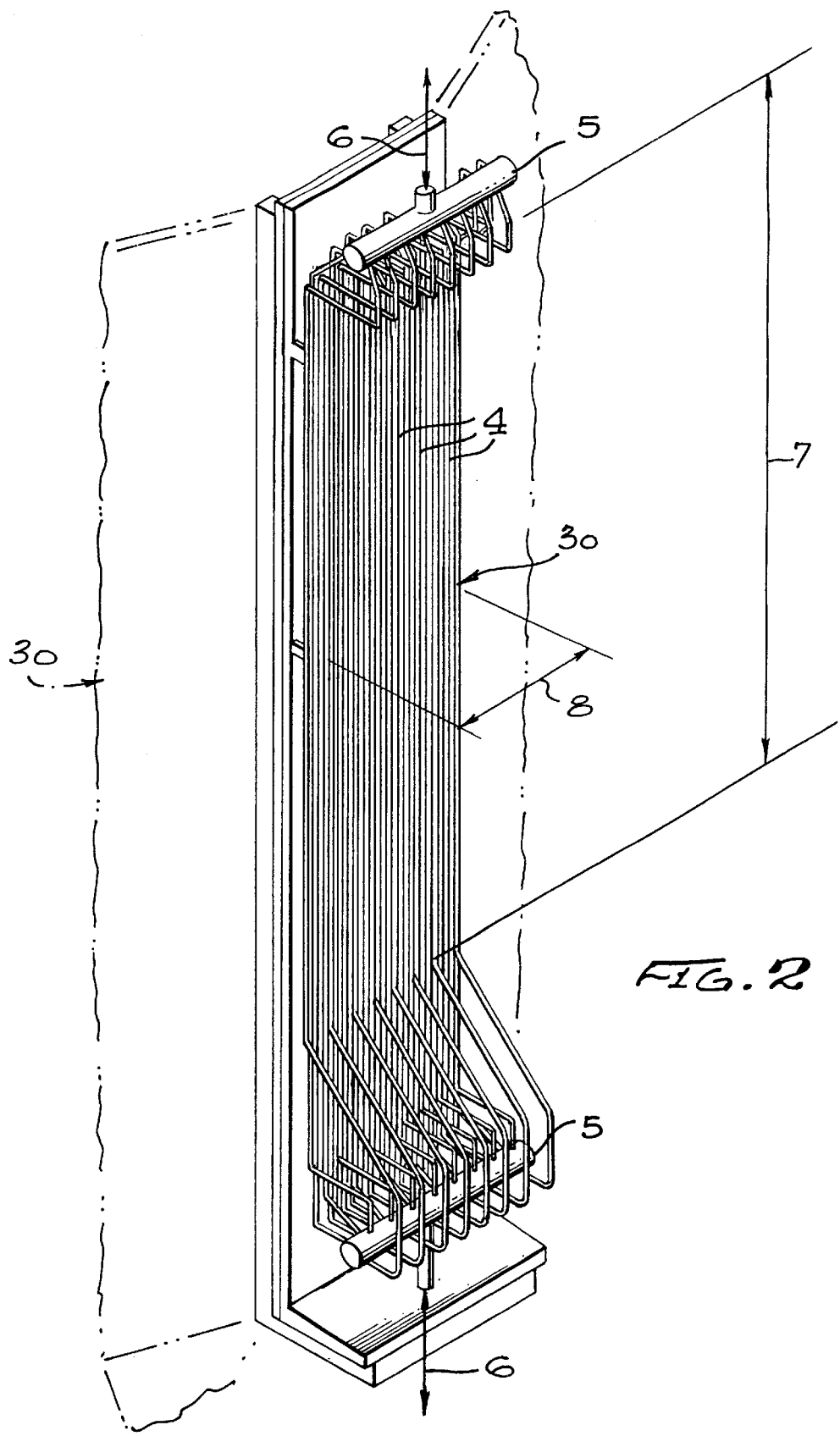
FIG. 2 is an isometric view of a typical molten salt, solar absorption panel.

FIG. 2 shows a typical molten salt solar absorption panel 30 with its absorption tubes 4 which can be of seamless, welded or welded and drawn construction; and of any ASME Boiler and Pressure Vessel Code approved construction material which is compatible with molten sodium-potassium nitrate salt and has acceptable thermal fatigue properties.

The panel's tubes 4 are butt welded to headers 5. The molten salt flow 6 enters or exits the panel through its headers 5 which distributes/collects the salt flow to/from the tubes 4. The solar absorption area is the tube's absorption length 7 by panel width 8. This area receives the sun's 50 rays 51 from the heliostat field 2 to provide thermal energy to the flowing molten salt. In this embodiment the receiver 1 is composed of multiple panels 30 arranged in two circuits, each with eight panels, having a serpentine flow path and forming a polyhedral, cylindrical surface.

FIG. 3 shows a side view of the solar absorption panel with its key components. The tube 4 is composed of a straight section 9 and two end bends 10. These are welded together with butt welds 11 which are located out of the solar absorption length 7. The tube 4 is supported on the strong back 12 through tube supports 13 which provide for free axial expansion.

The hot absorption tubes are insulated on their back-side with ceramic fiber blanket 14 to minimize heat losses.

FIG. 4 shows a detail of the solar absorption tube 4 with the staged twist, twisted-tape insert 15 located within the straight section 9.

The twisted-tape 15 is composed of two loose twist sections 16, one at each end, and a central tight twist section 17. As shown in FIG. 4, the loose twist sections 16 are located within the low flux regions 18 to minimize the molten salt's fluid flow pressure loss. The loose twist pitch/diameter ratio and its extent are determined by evaluating the tube's thermal strain over the entrance and exit regions for all panels. The maximum loose twist pitch/diameter ratio that provides a significant region of reduced pressure loss while meeting the tube's allowable thermal fatigue limit is selected to minimize operating costs.

The tight twist section 17 is located in the high flux region 19 to provide the cooling necessary to hold the tube's thermal strains within the tube material's fatigue allowables.

The receiver solar flux distribution along the panel's length is set in a low-high-low pattern 18-19-18 so that the receiver can be as small as practicable while providing low flux regions at each end to avoid over-heating uncooled structures.

The twisted-tape insert 15 should be constructed from a material that matches the tube material's coefficient of thermal expansion and molten salt's corrosion resistance. For example, Inconel alloy 625 LCF® for both tube and twisted-tape.

The twisted-tape insert 15 is located and constrained within the tube 4 by the slight bow caused by welding the attachment to the tube at each tube support attachment point 20. During operation an additional outward bow (towards the sun's rays) due to the flux induced temperature difference across the tube's diameter constrains and holds the twisted-tape insert against fluid flow and seismic induced forces. As a back-up to these restraints the insert ends are formed 21 and located 22 to provide a physical stop against the tube butt weld drop-through 23 as shown in FIG. 5. The insert is located a sufficient distance 22 from the butt weld 11 at each end to avoid interference with the weld process and to eliminate buckling the insert 15 due to relative thermal growth between the twisted-tape insert 15 and tube 9.

The solar central receiver's solar absorption area is significantly reduced by the use of the staged twist, twisted-tape insert as demonstrated in Table 1.

Examination of Table 1 clearly shows the substantial size and performance improvements obtained by the use of a staged twist, twisted-tape insert in lieu of a smooth tube for a receiver constructed from Inconel alloy 625 LCF®.

A peak absorbed heat flux greater than the 1.60 MW/M$^2$ for the twisted-tape insert tubed panel shown in Table 1 is achievable by decreasing the tube diameter to increase the salt's heat transfer coefficient (which effectively decreases the across the tube diameter temperature difference, hence tube thermal strain) or reducing the tube wall thickness below 0.049 inches to decrease the through wall thermal gradient, hence tube thermal strain. Because the selected wall thickness of 0.049 inches is set by the requirement to obtain reliable butt and tube wall attachment welds this approach cannot be used, while reducing the tube diameter results in increased pumping power costs due to larger pressure losses and increased receiver fabrication costs due to the larger number of smaller diameter tubes required.

Although the magnitude of tape twist does impact the fluids heat transfer coefficient and pressure loss; the 3.2 pitch/diameter tight twist is the practical maximum and the 12 pitch/diameter loose twist is the minimum that is able to yield tube strains within the allowable, while proving a substantially reduced pressure loss.

A parametric, cost optimization analysis shows that the tightest possible twist yields the lowest cost receiver, hence the central and end region tape twist values shown in table 1.

TABLE 1

Loose-Tight-Loose Twist, Twisted-Tape Insert Yields Size and Performance Improvements for a Surround Field, Molten Salt, Solar Central, Inconel Alloy 625 LCF® Cylindrical Receiver Rated at 468 MW(T)

| Configuration | Smooth Tube | Twisted-Tape Insert |
|---|---|---|
| Receiver Area (M$^2$) | 648 | 574 |
| Pressure Loss (PSID) | 228 | 204 |
| Efficiency (%) | 90.2 | 90.5 |
| Highest Power Panel | | |
| Average absorbed heat flux (MW/M$^2$) | 1.15 | 1.29 |
| Peak absorbed heat flux (MW/M$^2$) | 1.42 | 1.60 |
| Average incident flux (MW/M$^2$) | .80 | .90 |
| Solar Absorption Panel | | |
| Length (ft.) | 47.1 | 44.74 |
| Width (ft.) | 9.25 | 8.63 |
| Tube, OD (in.) | 1.50 | 2.25 |
| wall thickness (in.) | 0.049 | 0.049 |
| Number of tubes | 74 | 46 |
| Tape twist: pitch/diameter | N/A | 12–3.2–12 |
| Twist length (ft.) | N/A | 8.15–28.44–8.15 |
| Heat transfer coefficient $\left(\frac{BTU}{hr.\ ft.^2\ °F.}\right)$ | 1380 | 1210–1570–1210 |
| Number of flow circuits | | 2 |
| Number of panels/flow circuit | | 8 |
| Salt temperature, | | |
| inlet (°F.) | | 550 |
| outlet (°F.) | | 1050 |

Because minimum system cost is the key criterion for the successful development of a commercially viable solar power plant, the values shown in Table 1 are based on a receiver flux distribution which is optimized to provide the lowest cost receiver/heliostat field combination.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A solar central receiver comprising:

a straight tube, the tube having two ends, each end a having a butt welded end bend, the tube having a molten salt therein for transporting heat, a staged twist, twisted-tape inside the straight tube such that the molten salt in the tube swirls at different rates in the tube for absorbing heat at rates corresponding to a peak thermal strain in the tube for each twist stage, a butt weld drop through at each end of the straight tube to restrict the axial movement of the staged twist, twisted tape in the tube without inhibiting the flow of the molten salt.

2. A solar central receiver as in claim 1 wherein:

the staged twist, twisted-tape is staged in a loose-tight-loose configuration.

3. A solar central receiver comprising:

a strongback, a tube, the tube slidably attached to the strongback at a plurality of attachment points such that the tube is axially free to move, the tube being bowed at the attachment points, a staged twist, twisted-tape inside the tube, the staged twist, twisted-tape being partly restrained in the tube by the tube being bowed at the attachment points, a butt weld in the tube to prevent axial movement of the twisted tape axially in the tube beyond the butt weld, such that a fluid flowing in the tube swirls at different rates in the tube, due to the different twist stages, for absorbing heat at rates corresponding to the peak thermal strain in the tube for each twist stage.

* * * * *